United States Patent [19]

Czysch et al.

[11] 4,026,990

[45] May 31, 1977

[54] PRODUCTION OF LOW-FLUORINE GYPSUM AS A BY-PRODUCT IN A PHOSPHORIC ACID PROCESS

[75] Inventors: Werner Czysch, Linz; Walter Müller, Leonding; Heinz Göller, Linz, all of Austria

[73] Assignee: Chemie Linz Aktiengesellschaft, Linz, Austria

[22] Filed: Dec. 11, 1975

[21] Appl. No.: 639,928

[30] Foreign Application Priority Data

Dec. 11, 1974 Austria .................. 9892/74

[52] U.S. Cl. .................. 423/167; 423/320; 423/321 R; 423/555
[51] Int. Cl.² .................. C01F 1/00; C01F 5/00; C01F 11/00; C22B 26/20
[58] Field of Search .......... 423/167, 321, 320, 555

[56] References Cited

UNITED STATES PATENTS

| | | | |
|---|---|---|---|
| 1,858,203 | 5/1932 | Fiske | 423/321 |
| 1,969,449 | 8/1934 | Bryan | 423/555 |
| 2,123,785 | 7/1938 | Knox et al. | 423/321 |
| 3,151,941 | 10/1964 | Hollingsworth et al. | 423/321 |
| 3,193,351 | 7/1965 | Miller et al. | 423/321 |
| 3,323,864 | 6/1967 | Lapple | 423/167 |
| 3,505,013 | 4/1970 | Araki et al. | 423/167 |
| 3,743,725 | 7/1973 | Case | 423/107 |
| 3,764,658 | 10/1973 | Darwin et al. | 423/321 |

FOREIGN PATENTS OR APPLICATIONS

| | | | |
|---|---|---|---|
| 1,248,037 | 9/1971 | United Kingdom | 423/555 |

*Primary Examiner*—O. R. Vertiz
*Assistant Examiner*—Eugene T. Wheelock
*Attorney, Agent, or Firm*—Wenderoth, Lind & Ponack

[57] ABSTRACT

A process for purifying waste gypsum from the wet phosphoric acid process to a maximum fluorine content of 0.25 % by weight based on the anhydride, which comprises adding active silicic acid in two portions during the course of the phosphoric acid process, wherein at least half the total amount of silicic acid added is added during the decomposition of the crude phosphate and the remainder is added after the end of the decomposition but before the waste gypsum is filtered off, and the waste gypsum, after it has been filtered, is made into a suspension with water, separated from the liquid phase and dried.

5 Claims, No Drawings

PRODUCTION OF LOW-FLUORINE GYPSUM AS A BY-PRODUCT IN A PHOSPHORIC ACID PROCESS

This invention relates to a process for the purification of waste gypsum.

It is known that waste gypsum, such as that formed in the digestion and decomposition of crude phosphates by reaction with sulphuric acid according to the so-called wet phosphoric acid process, should have a limited fluorine content if it is to be suitable for use in the cement-sulphuric acid process. (The expression "fluorine content" in this context denotes compounds such as calcium fluoride, fluoroapatite and sodium silicofluoride).

In general, the requirement is that the anhydride used for the preparation of the raw mix, and which is obtained from the waste gypsum by calcination, should have a fluorine content of no more than 0.25% by weight.

Instead of subjecting waste gypsum to appropriate purification processes (see, for example, the processes disclosed in West German Auslegeschrift No. 1,928,771, West German Patentschrift No. 47,180, United Kingdom Pat. No. 1,104,738 or West German Offenlegungsschrift No. 2,109,715 and 2,208,049, the last two of which describe more comprehensive and thus correspondingly more expensive purification processes), it is more advantageous to choose the decomposition methods for the crude phosphate so that a sufficient de-fluorination effect is thereby achieved. (see Dahlgren, Chemie-Ing.-Technik, 45th Annual Issue, 1974/No. 14).

Hitherto, the procedure comprised forming Si-F compounds by adding active silicic acid directly to finely ground crude phosphate or to the decomposition mixture acidified by mineral acid, immediately before the start of the reaction. The said compounds partly evaporate or partly remain dissolved in the crude phosphoric acid, but nevertheless the separated waste gypsum remains impure to a more or less large degree on account of unreacted fluorine compounds (see, for example, U.S. Pat. No. 1,969,449 or French Pat. No. 1,149,919).

Since a sufficiently defluorinated waste gypsum was clearly never obtained by the aforementioned prior procedures, a "Process for the production of pure calcium sulphate in the maufacture of phosphoric acid" has recently been published which discloses a process in which all compounds which may upset the further processing of the waste gypsum, such as compounds of potassium or strontium, are precipitated in the phosphoric acid-acidified crude phosphate decomposition mixture by a preliminary precipitation process, and are separated from the primarily formed calcium phosphate solution before the sulphuric acid is added (West German Offenlegungsschrift No. 2,218,382). According to the process disclosed the removal of fluorine is effected by adding active silicic acid and sodium sulphate. The sparingly soluble sodium silicofluoride formed is filtered off and the decomposition is completed by adding sulphuric acid. It thus follows from the mentioned state of the art that the mere addition of active silicic acid in its various forms to the crude phosphate decomposition mixture in order to produce a gypsum having a sufficiently low fluorine content, is considered insufficient.

It was therefore not to be expected that a gypsum having a sufficiently low fluorine content could be obtained within the scope of the wet phosphoric acid process merely by adding active silicic acid in its various forms to the crude phosphate decomposition mixture, when, rather than adding the silicic acid all at once before the start of the decomposition reaction as was done hitherto, the silicic acid is added in two portions, the first portion being added at the start of the decomposition reaction and the second portion after the end of the decomposition, before the waste gypsum is filtered off.

The effectiveness of adding a second portion of silicic acid which, in contrast to the reaction time of the silicic acid during the digestion and decomposition, may act for only a few minutes up to at most 1 hour, is in this connection extremely surprising.

Accordingly the present invention provides a process for the purification of waste gypsum from the wet phosphoric acid process to an extent such that the maximum fluorine content of the purified waste gypsum is 0.25% by weight, based on the anhydride, which comprises adding active silicic acid in two portions during the course of the phosphoric acid process, wherein at least half the total amount of silicic acid is adding during the decomposition of the crude phosphate and the remainder is added after the end of the decomposition but before the waste gypsum is filtered off, and the waste gypsum, after it has been filtered, is made into a suspension with water, separated from the liquid phase, and dried.

The total amount of active silicic acid is from 1 to 4%, preferably 2 to 3%, by weight, based upon the crude phosphate used. In this connection kieselgur (diatomite), finely ground quartz or precipitated silicic acid may be used as active silicic acid. In the case of precipitated silicic acid, silicic acid occurring as a by-product in other chemical processes may be used.

The amount of silicic acid added must of course be adjusted to the fluorine content of the crude phosphate, in other words the amount of silicic acid is as a rule increased with increasing fluorine content. On the other hand, any silicic acid present in the crude phosphate may also have some effect, though it should be noted that the $SiO_2$ content in crude phosphates is frequently in a form in which it has little or no effect with regard to defluorination. It is therefore recommended to take the silicic acid content in the crude phosphate into account only in those cases where preliminary experiments have shown that it is in fact active with regard to defluorination.

Usually the first portion of the active silicic acid added is one-half to two-thirds, and the second portion is one-half to one-third of the total amount, and preferably the first addition of silicic acid will be larger than the second. Preferably two-thirds of the total amount of silicic acid added is added at the start, and one-third before the filtration. The optimum ratio of the silicic acid amounts added at the two points easily may be determined taking into account the general digestion and decomposition conditions.

The expression "active silicic acid" means primarily finely ground quartz, sand, kieselgur or precipitated silicic acid. The reaction time of the two additions of silicic acid does not extend beyond the normal decomposition times, which is extremely advantageous. The reaction time from the first silicic acid addition is preferably from 3 to 9 hours, more preferably from 6 to 9

1 hours, and for the addition of the second portion, which is effected after the end of the decomposition up to the filtering off of the calcium sulphate, the reaction time is preferably 5 to 60 minutes, more preferably 20 to 60 minutes. The necessity of longer reaction times, especially after the second silicic acid addition, has likewise not been established up to now, in spite of the fact that crude phosphates of different origins and varying fluorine contents were investigated, although longer times may be used in special cases.

The expression "wet phosphoric acid process" used herein is intended to mean all those processes which are carried out with the addition of sulphuric acid. The digestion and decomposition temperatures are mostly from 70° to 80° C. At temperatures higher than the corrosion problems gradually increase, but are, however, not very important within the scope of the present process.

The addition of the first portion of active silicic acid may be effected by admixture with the finely ground crude phosphate, or it may be added with the decomposition acids. The second portion of the silicic acid is metered into the decomposition mesh after the latter has left the decomposition vessel but before it is passed to the filter. The metering procedure is conveniently carried out in a further container, the size of which has to be selected corresponding to the desired residue time.

The amount of water used for making the suspension of the gypsum is not critical. Care should simply be taken to see that the suspension remains in a workable state. As a rule a 20 to 45% by weight aqueous suspension of the gypsum is prepared, and preferably the amount of water chosen is such that a 30 to 40% suspension is formed.

The following Examples illustrate the invention and the manner in which it may be performed.

EXAMPLE 1

8.7 tonnes of Morocco phosphate containing 29.8% $P_2O_5$, 48.4% CaO and 3.8% F is ground so that 85% has a grain size below 0.15 mm. This amount is added to reaction vessels of known construction containing 170 m$^3$ of a suspension of $CaSO_4.2H_2O$ in phosphoric acid with a $P_2O_5$ content of approximately 28%. Before the crude phosphate is introduced into the reaction vessels, 2% of kieselgur, based on the weight of the crude phosphate, is added to the phosphate. This amounts to 174 kg of kieselgur. At the same time, a recycle acid containing 22% $P_2O_5$, namely the crude phosphoric acid from the first wash zone after the filter, is added to the mash at a rate of 10 tonnes per hour, together with 13,400 kg of 56% concentration $H_2SO_4$ per hour, and a $SO_3$ content of 1.5 to 3% is thereby produced. The reaction temperature is 72° C.

After the end of the decomposition reaction and before the mash is passed to the filter, a second portion of kieselgur is added in a further vessel in an amount of 1% based on to the crude phosphate, a reaction time of 30 minutes being maintained. In this case also the reaction temperature is 72° C.

The reaction mixture is then filtered through a plane rotary filter. The gypsum on the filter is formed into a 30% suspension with water and is then eluted by an upward-current "sizing" of the organic substances present.

The gypsum is filtered a second time on the rotary filter and is then calcined for the purposes of further processing by the cement-sulphuric acid process. Its fluorine content of 0.15% based on the anhydrite is in accord with the requirements. The fluorine content of the waste water may be reduced in a known manner. Just as good results may be obained by the process according to the invention if crude phosphates from other sources are used.

Thus, using a Florida pebble phosphate having a fluorine content of 4%, a waste gypsum was obtained which contained 0.08% F.

EXAMPLE 2

8.3 tonnes/hour of pebble phosphate containing 33.8% $P_2O_5$, 49.0% CaO and 3.94% F is digested and decomposed in the manner described above with 13,000 kg/hour of 56% concentration $H_2SO_4$, with the addition of 83 kg/hour of finely ground quartz sand, i.e. 1% of the crude phosphate employed, and the corresponding amounts of recycle acid.

Before the mash is passed to the filter, quartz sand is added a second time in a further vessel in an amount of 1% based on the crude phosphate amount, a reaction time of 45 minutes being maintained. After filtration the gypsum is made into a 40% suspension with water and is filtered once more. After calcination the gypsum obtained in the abovedescribed processing contains only 0.08% F based o the anhydrite.

EXAMPLE 3

In a phosphoric acid production process carried out in a continuous manner on a laboratory scale, 70.5 g/hour of Morocco phosphate containing 31.4% $P_2O_5$, 50.7% CaO and 4.0% F is reacted with 115 g/hour of 56% concentration $H_2SO_4$ in an acid-resistant vessel provided with a stirrer, together with approximately 22% recycle acid (based on the $P_2O_5$ content) in a suspension of $CaSO_4.2H_2O$ in phosphoric acid with a solids content of 35% at 72° 1 C and an average residence time of 8 hours. 1 g/hour of kieselgur (1.5% based on the crude phosphate) is added together with the crude phosphate to the decompositon mash.

Before the mash is filtered, a second amount of kieselgur, namely 0.7 g/hour i.e. 1% of the crude phosphate amount, is added to the mash in a further vessel and a reaction time of 25 minutes at 72° C is maintained.

After the filtration and processing according to Example 1, the gypsum formed still contains only 0.19% F based on the anhydrite.

What we claim is:

1. In a method for recovering waste gypsum from the wet phosphoric acid process, which method comprises digesting and decomposing crude phosphate in sulfuric acid, filtering waste gypsum from the reaction mixture, mixing the waste gypsum with water to form an aqueous suspension, separating the waste gypsum from the water and drying the separated waste gypsum, the improvement wherein an active silicic acid selected from the group consisting of ground quartz, sand, kieselgur and precipitated silicic acid is added to the reaction system in two portions totaling 1 to 4% by weight based on the weight of the crude phosphate, the first portion of the active silicic acid constituting one-half to two-thirds the total amount of the active silicic acid and the second portion of the active silicic acid constituting the remainder of the total amount of the active silicic acid, said first portion being added to the reaction system prior to digestion and decomposition of the crude phosphate, said second portion being added to the reaction system subsequent to digestion and decomposition of the crude phosphate and prior to filtration of the waste gypsum from the reaction mixture, said improved method resulting in recovery of waste gypsum having a fluorine content not greater than 0.25% by weight based on the weight of the calcium sulfate in the waste gypsum.

2. A process according to claim 1, in which the total amount of the active silicic acid is 2 to 3% by weight based on the weight of the crude phosphate.

3. A process according to claim 1, in which the reaction time after the addition of the first portion of active silicic acid is from 3 to 9 hours and the reaction time after the addition of the second portion of active silicic acid is from 5 to 60 minutes.

4. A process according to claim 3, in which the reaction time after the addition of the first portion is from 6 to 9 hours and the reaction time after the addition of the second portion is from 20 to 60 minutes.

5. A process according to claim 1, in which the aqueous suspension contains 20 to 45% by weight of gypsum.

* * * * *